Figure 1:
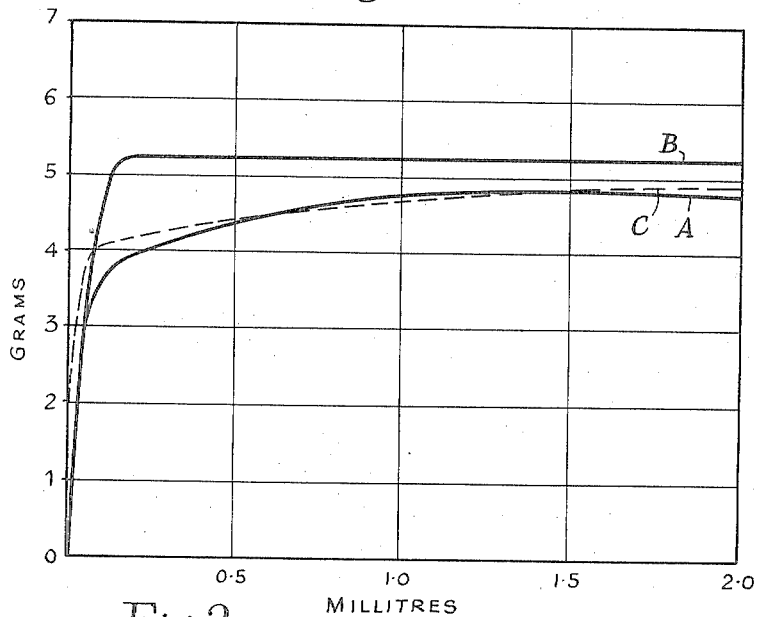

Sept. 18, 1956 G. I. P. LEVENSON 2,763,531
MANUFACTURE OF SODIUM THIOSULPHATE FROM SODIUM
SULFITE AND SULFUR IN PRESENCE OF CATIONIC
SURFACE ACTIVE ORGANIC BROMIDES
Filed Nov. 29, 1952 3 Sheets-Sheet 3

INVENTOR
GERALD ISAAC PASTERNAK LEVENSON

BY
Daniel J. Mayne.
Scranton C. Van Houten
ATTORNEYS

United States Patent Office 2,763,531
Patented Sept. 18, 1956

2,763,531

MANUFACTURE OF SODIUM THIOSULPHATE FROM SODIUM SULFITE AND SULFUR IN PRESENCE OF CATIONIC SURFACE ACTIVE ORGANIC BROMIDES

Gerald Isaac Pasternak Levenson, Wealdstone, Harrow, England, assignor to Eastman Kodak Company, Rochester, N. Y., a corporation of New Jersey Application November 29, 1952, Serial No. 323,306

4 Claims. (Cl. 23—115)

This invention relates to the manufacture of thiosulphates and selenosulphates. It is well known that sodium thiosulphate, for example, is commercially manufactured on a large scale by heating a solution of sodium sulphite containing a suspension of sulphur. The selenosulphate is made in an analagous manner.

According to the present invention there is provided an improved method of making alkali metal thiosulphates, ammonium thiosulphate and calcium thiosulphate which consists of digesting the corresponding sulphite with sulphur in the presence of water and a cationic surface-active agent. If desired, the sulphite can be formed in situ from sulphur dioxide, especially in the case of making ammonium thiosulphate.

I have found that the presence of such cationic surface-active agents greatly accelerates the reaction of the sulphur and sulphite, often to such a great extent that very appreciable amounts of the thiosulphate can be obtained in conditions of time and temperature etc. under which, in the ordinary way, i. e. without the cationic surface-active agent the amount of thiosulphate obtained is so small as to be negligible.

In a modification of the invention, selenium is used in place of the sulphur and in this event, the product obtained is a selenosulphate instead of a thiosulfate.

Cationic surface-active agents are well recognised substances in the chemistry of surface activity, therefore there is no difficulty in selecting such substances from a wide field, for instance it is well-known that it is necessary to have due regard to the nature of substituent groups and preferably to employ compounds with long aliphatic side chains. Examples of cationic surface-active agents which can be used in the present invention are dodecyl and cetyl pyridinium halides.

I am aware that an emulsifier has been used in the manufacture of sodium thiosulphate—see Thorpe's Dictionary 4th edition, vol X, p. 895 and C. I. O. S. Report, item 22, file No. XXIX–14, p. 32. However, the emulsifier used in that case, namely Humectol which is a sulphonated sodium ethyl amide of oleic acid, functions as an anionic surface-active agent and is used in relatively large quantities to produce a wetting effect.

In the manufacture of ammonium thiosulphate in the ordinary way, the necessarily prolonged digestion of the sodium sulphite has the serious disadvantage that the ammonium thiosulphate as it is formed is also slowly decomposed giving off ammonia and precipitating sulphur, consequently if the reaction is allowed to proceed over a fairly long period the amount of undissolved sulphur present is seen first to decrease and then to increase. Therefore under any given set of conditions of temperature and concentration there is an optimum time at which the maximum concentration of ammonium thiosulphate exists in the mixture; on prolonging the time of digestion the amount of ammonium thiosulphate present decreases. For these reasons, the maximum yield of ammonium thiosulphate by the ordinary method is poor.

In the manufacture of ammonium thiosulphate by the present invention, not only is the formation of the ammonium thiosulphate very greatly accelerated, but the maximum yield obtainable is very considerably increased because the ammonium thiosulphate formed does not need to be maintained so long at the high temperature.

In the case of the manufacture of the alkali metal selenosulphates, the ammonium selenosulphate and the calcium selenosulphate, the selenosulphate, as it is formed, tends to decompose throwing out selenium. Therefore, in the manufacture of the selenosulphates by the present invention, the maximum yield is likewise considerably increased as compared with the prior methods.

When performing the present invention the amount of cationic surface-active agent is not critical, and even minute traces help to accelerate solution. The amount of water present in the reaction mixture can be kept low, for instance, at an amount just sufficient to dissolve the thiosulphate formed.

The results obtained by the present invention are shown with reference to the accompanying drawings:

Fig. 1 is a graph in which the abscissa is millilitres of a 1% solution of cationic surface-active agent and the ordinate is grams of sulphur. The curves show the amount of sulphur dissolved in 4 minutes when one-fifth of a gram-mol. of sulphite (namely 50 grams in the case of $Na_2SO_3.7H_2O$ and 27 grams in the case of

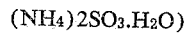

$(NH_4)_2SO_3.H_2O)$ is digested with 7.0 grams of flowers of sulphur and quantities of 1% solution of cationic surface-active agents between zero and 2 millilitres, at 94° C. with 10 ml. of added water, curve A is for sodium sulphite with "Fixanol C" which is a commercial quality of cetyl pyridinium bromide, curve B is for sodium sulphite with dodecyl pyridinium bromide, curve C is for ammonium sulphite with dodecyl pyridinium bromide. With zero cationic surface-active agent, the curves meet with ordinate at about ¼ gram sulphur.

Figure 2:
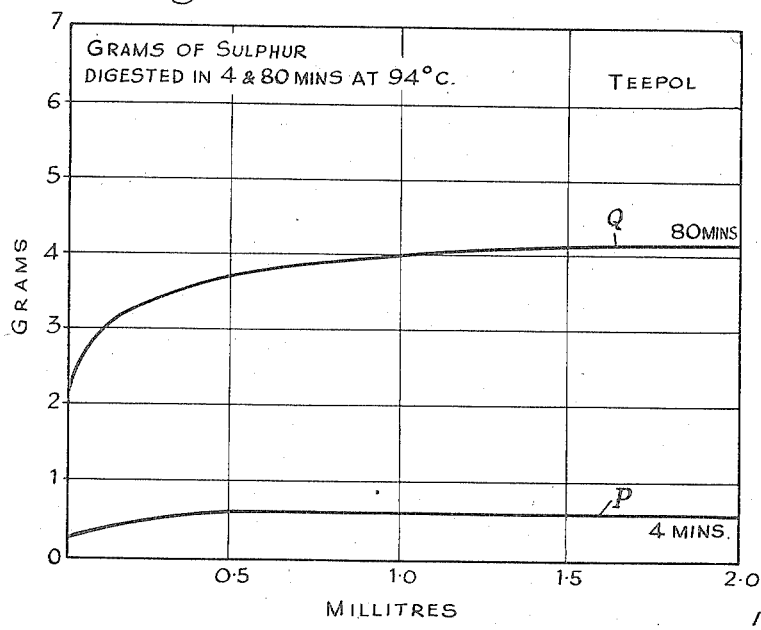

Fig. 2 is a graph with the same ordinates as Fig. 1 showing, for comparison purposes, some results obtained by using 0 to 2 ml. of a 10% solution of "Teepol." "Teepol" is a well-known commercial anionic surface-active agent made by Shell Technical Products and sold in the form of a solution. The 10% solution used in the present tests was made by diluting one volume of commercial "Teepol" with 9 volumes of water.

Figure 3:
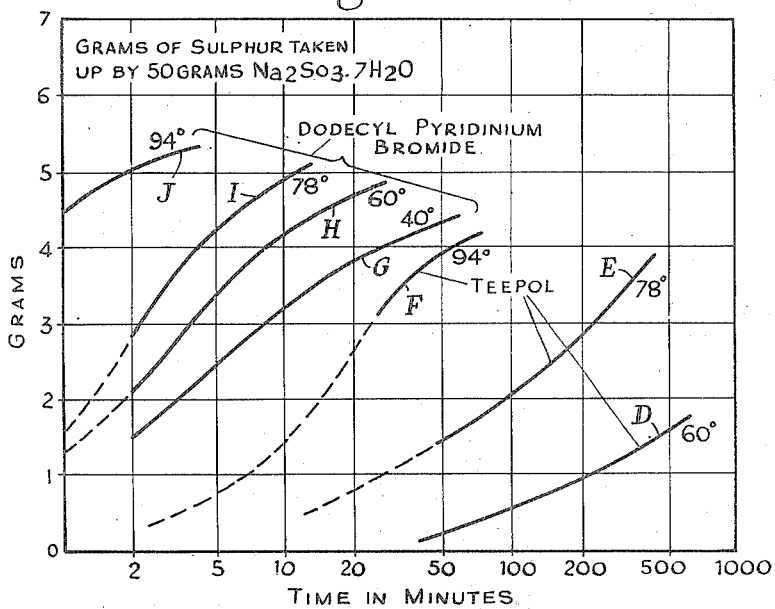
Figure 4:
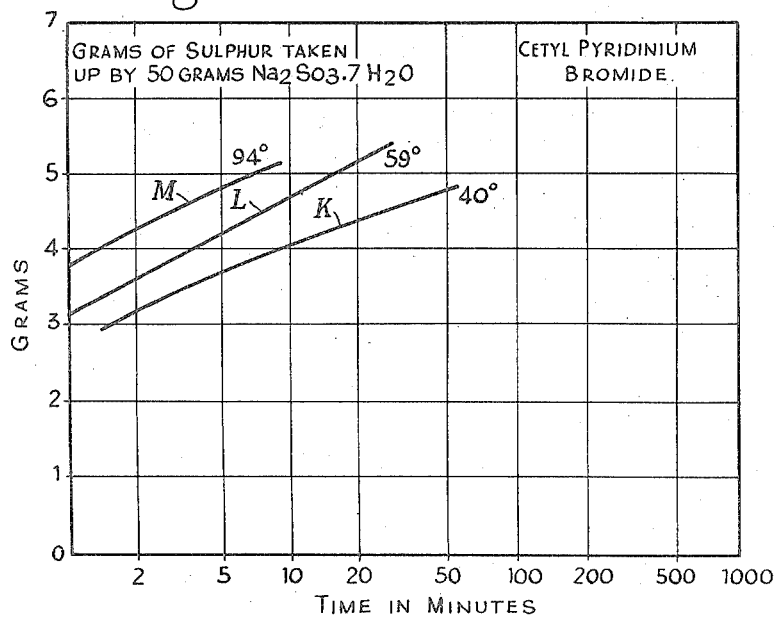

Figs. 3 and 4 are graphs in which the abscissa is time in minutes from 1 to 1000 logarithmically, and the ordinate is in grams of sulphur. Curves D, E and F show the sulphur dissolved from an initial quantity of 7.0 grams by 50 grams of $Na_2SO_3.7H_2O$ using 2 ml. of a solution of 10% solution of "Teepol" at 60° C., 78° C. and 94° C. respectively, while curves G, H, I and J show the sulphur dissolved by the same amount of sodium sulphite using 0.2 ml. of a 1% solution of dodecyl pyridinium bromide at 40° C., 60° C., 78° C. and 90° C. respectively. Analogously curves K, L and M show the sulphur dissolved by the same amount of sodium sulphite at 40° C., 59° C. and 94° C. respectively using 1 ml. of a 1% solution of "Fixanol C" with 10 ml. of additional water.

Figure 5:
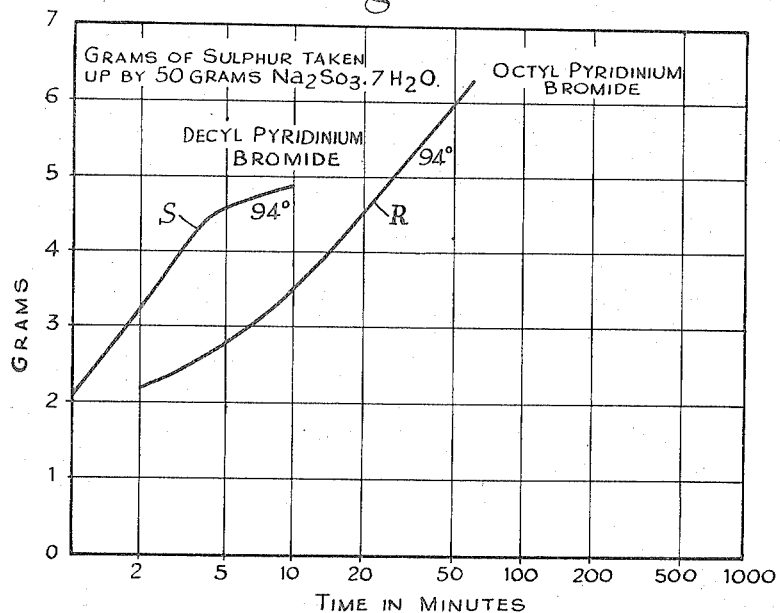

Fig. 5 uses the same ordinates as Figs. 3 and 4 and shows the results obtained at 94° C. with octyl pyridinium bromide (curve R) and decyl pyridinium bromide (curve S) in place of the dodecyl compound.

Figure 6:
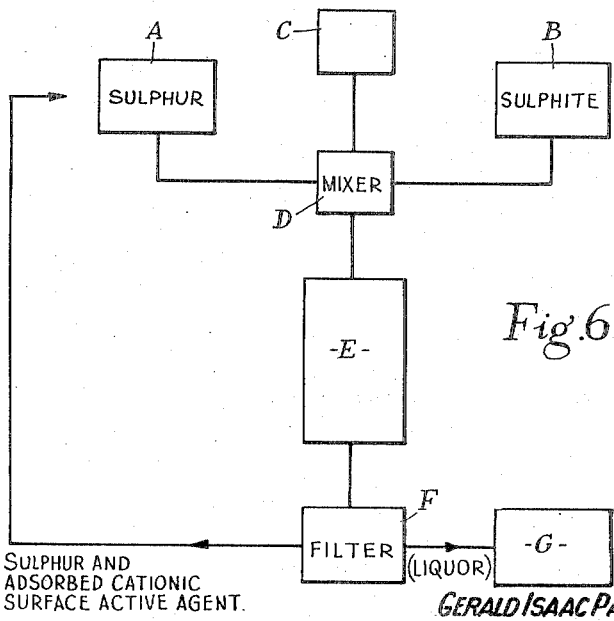

Fig. 6 is a flow diagram representing in schematic form one way in which the process can be operated continuously.

The curves of Figs. 1, 2, 3, 4 and 5 illustrate the strikingly different results obtained when using anionic and cationic surface-active agents. Curves P and Q show the amount of sulphur in grams dissolved in 4 minutes and 80 minutes respectively, at 94° C. using amounts of a 10% solution of the anionic surface-active agent "Teepol." These curves show that with "Teepol" the amount of sulphur dissolved in 4 minutes is at best only a little more than ½ gram, and even in 80 minutes is only about 4 grams. This illustrates, that when a cationic surface-active agent is used it exerts a special effect very considerably above and beyond that due merely to its wetting properties.

Tests show that the results obtained when using sulphonated sodium alkyl amides of oleic acid are of the same kind as those obtained with "Teepol" given above. For instance, "Igepon T," which is a sulphonated sodium methyl amide of oleic acid used in a 1% solution, gives a curve at 94° C. which is substantially identical with curve F in Fig. 3.

In the following Examples Nos. 1 and 2 illustrate the process of the present invention using somewhat less than the amount of sulphur and selenium (respectively) which is theoretically equivalent to the amount of sulphite used, consequently the end of the complete reaction can be very conveniently observed, namely when the whole of the emulsion and selenium have been dissolved. Example 3 illustrates the process using more than the theoretically equivalent amount of sulphur.

*Example 1*

3 grams of sodium sulphite (anhydrous) and 0.5 gram of finely divided sulphur are boiled together in 20 ml. of water containing 0.002 g. of dodecyl pyridinium bromide of "Fixanol C" (commercial cetyl pyridinium bromide). After only about five minutes boiling the sulphur becomes dissolved and thereafter the solution of sodium thiosulphate which has formed is filtered and concentrated. The sodium thiosulphate may be crystallized out if desired. Without the addition of accelerator the dissolution takes 20 minutes.

*Example 2*

3.5 grams of sodium sulphite (anhydrous) and 1 gram of finely divided selenium powder are boiled together in 20 ml. of water containing 0.005 g. of dodecyl pyridinium bromide or "Fixanol C." After only about five minutes boiling the selenium becomes dissolved and a solution of sodium selenosulphate is formed.

*Example 3*

50 parts by weight of crystalline sodium sulphite ($Na_2SO_3.7H_2O$) and 7 parts by weight of finely divided sulphur and 10 parts by weight of water containing $\frac{1}{100}$ of a part by weight of "Fixanol C" are mixed to ensure a uniform distribution of the "Fixanol C." Heat this mixture to about 85–95° C. by any suitable means, e. g. by injection of steam and maintain the temperature approximately for about 15 minutes. The thiosulphate so formed is then in solution and can be directly filtered to remove the unused sulfur. This solution which contains a small amount of sulphite can be crystallized to remove crystals of sodium thiosulphate.

It is of course not always necessary to isolate the thiosulphate from the solution in which it is formed, for instance the solution obtained in Example 3 which contains only a small amount of sodium sulphite can be either evaporated to give a solid powder mixture or it can be diluted with sufficient water to prevent crystallization; in either form the mixture is suitable for use in chemical processes where a small amount of sodium sulphite is unimportant. It is well known that sodium sulphite is often mixed with sodium thiosulphate when the latter is used in photographic processes and the present invention provides such a mixture in a simple and rapid manner. The same remarks apply, of course, to the ammonium thiosulphate made in an analogous manner.

It will be apparent that in view of the great rapidity of reaction in the process of the present invention it has the great advantage that it is quite unnecessary to operate at temperatures above the melting point of the sulphur and selenium.

The process of the present invention can be operated, if desired, as a continuous process and is very convenient for this purpose on account of the rapidity with which the reaction can be carried out. For instance, sodium sulphite can be fed from one hopper and finely divided sulphur from another hopper and a solution of the cationic surface-active agent from a third hopper into a single pipe line which can be easily maintained at an elevated temperature and the rate of flow being so adjusted that the mixture emerging from the heated pipe line will contain the desired thiosulphate. This mixture can then be made to pass through a filter press and the resulting solution evaporated or subjected to crystallization according to whether it is desired to obtain thiosulphate containing sulphite or to obtain pure thiosulphate.

The flow diagram in Fig. 6 illustrates such a continuous process. In this diagram A represents a vessel containing finely divided sulphur and B represents a vessel containing sodium sulphite in small or crushed crystals or as a paste or slurry. C represents a solution of a suitable cationic surface-active agent. The sulphur, sulphite and cationic surface-active agent from A, B and C are fed to a mixer D and thence to a steam jacketed vessel E. The mixture which has reacted in E is then fed into the filter F. The unused sulphur is then fed back from the filter to A while the filtered liquor is fed to a dehydrator or a crystallizing plant G.

I claim:

1. The method of rapidly making sodium thiosulfate which comprises digesting sodium sulfite with sulfur in aqueous solution in the presence of a cationic surface active agent selected from the group consisting of octyl pyridinium bromide, cetyl pyridinium bromide, and dodecyl pyridinium bromide at a temperature within the range of 85° C. to the boiling point of the solution.

2. The method of rapidly making sodium thiosulfate which comprises digesting sodium sulfite with sulfur in aqueous solution in the presence of octyl pyridinium bromide.

3. The method of rapidly making sodium thiosulfate which comprises digesting sodium sulfite with sulfur in aqueous solution in the presence of dodecyl pyridinium bromide at a temperature at the boiling point of the solution.

4. The method of rapidly making sodium thiosulfate which comprises digesting sodium sulfite with sulfur in aqueous solution in the presence of cetyl pyridinium bromide, and heating the mixture from 85 to 95° C. for fifteen minutes.

References Cited in the file of this patent

UNITED STATES PATENTS

| | | |
|---|---|---|
| 1,636,106 | Naef | July 19, 1927 |
| 1,854,762 | Prunier | Apr. 19, 1932 |
| 1,854,847 | Kukn | Apr. 19, 1932 |
| 2,080,654 | Craig | May 18, 1937 |
| 2,412,607 | Farr | Dec. 17, 1946 |

FOREIGN PATENTS

| | | |
|---|---|---|
| 365,999 | Great Britain | Jan. 26, 1932 |
| 469,147 | Great Britain | July 27, 1937 |